United States Patent Office 3,247,219
Patented Apr. 19, 1966

3,247,219
3′-NITRO-2-OXO-3-OXAZOLIDINE CARBOXANILIDE
Richard C. Sovish, Ben Lomond, Calif., assignor to The Dow Chemical Company, Midland, Mich., a corporation of Delaware
No Drawing. Filed Sept. 24, 1962, Ser. No. 225,860
The portion of the term of the patent subsequent to Jan. 29, 1981, has been disclaimed
1 Claim. (Cl. 260—307)

This invention is concerned with organic chemical compounds and is particularly directed to the compound 3′-nitro-2-oxo-3-oxazolidine carboxanilide, of the formula

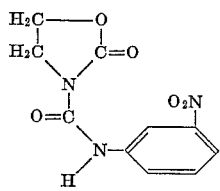

Under ordinary conditions the compound is a colorless to pale yellow crystalline solid melting at 168°–169° C. It is useful as a herbicide.

The compound of the present invention is readily prepared by a reaction in which 2-oxazolidinone and meta-nitrophenylisocyanate add together. The reaction is expressed schematically as

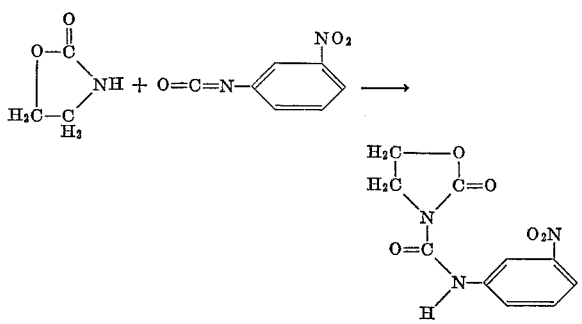

The reaction takes place smoothly, and consumes equimolecular quantities of the starting substances.

In carrying out the reaction to prepare the present compound, 2-oxazolidinone and meta-nitrophenyl isocyanate are contacted together. Conveniently, the contacting is carried out in an inert liquid reaction medium which may be, for example, a mixture of equal quantities of diethyl ether and benzene. Reaction takes place readily at room temperature and may be carried to completion thereat. Reaction may be carried out successfully in the absence of catalyst, or advantageously, in the presence of a catalytic amount of triethylamine. When the reaction is carried out at room temperature, a period of from a few hours to a few days usually suffices to carry the reaction essentially to completion with preparation of the desired product as a precipitate. Thereafter, for various of its uses, the resulting product may be used immediately without further processing to take advantage of its useful properties.

When it is desired to purify the product, such purification is readily carried out by separating crude product from the reaction mixture in which it was prepared, as, for example, by filtration; and washing the resulting product residue with a liquid which is a non-solvent or poor solvent for product but satisfactorily dissolves and washes away either starting material or triethylamine catalyst. One such liquid is hexane. Thereafter, if desired, product can be recrystallized from solvent such as an alcohol-acetone mixture.

The following example, without more, will enable those skilled in the art to practice the present invention.

*Example*

A mixture of 5 grams (0.058 mole) 2-oxazolidinone in a liquid consisting of equal volumes of diethyl ether and benzene was placed in a flask. Thereto was added 7 grams m-nitrophenyl isocyanate (melting at 52°–53.5° C.). Also, a small, undetermined amount (approximately 0.25 gram) of triethylamine was added as catalyst. The resulting mixture was thoroughly shaken to effect complete mixing. Thereafter, the flask and contents were set aside at room temperature of about 20°–25° C., for a period of time to permit reaction to go to completion. After approximately 75 hours, the flask was examined and found to contain a precipitated solid product. The flask contents were filtered, and product residue washed with hexane, dried to air dryness and examined. It was found to weigh 9.7 grams (slightly more than 80 percent of theoretical yield) and, before re-purification, to melt in the range of 135°–138° C. The dried product was then taken up in a hot mixture of alcohol and approximately 1/10 by volume of acetone and recrystallized therefrom as liquid cooled. As a result of these procedures there was obtained a recrystallized 3′-nitro-2-oxo-3-oxazolidine carboxanilide product melting at 168°–169° C.

The product is useful as a herbicide. The application as a soil drench of a liquid composition containing 4000 parts of the subject compound per million parts by weight of drench liquid resulted in the complete inhibition of the growth of seeds and kill of germinant seedlings of tomato plants therein.

I claim:
3′-nitro-2-oxo-3-oxazolidinecarboxanilide.

References Cited by the Examiner
UNITED STATES PATENTS

| | | | |
|---|---|---|---|
| 2,394,916 | 2/1946 | Jones | 71—2.6 |
| 2,556,664 | 6/1951 | Smith | 71—2.5 |
| 2,556,665 | 6/1951 | Smith | 71—2.5 |
| 2,687,403 | 8/1954 | Ballard et al. | 71—2.6 |
| 3,119,833 | 1/1964 | Sovish. | |

OTHER REFERENCES

Henry et al., J. Am. Chem. Soc., vol. 71, pages 2297–2300 (1949).

NICHOLAS S. RIZZO, *Primary Examiner.*
WALTER MODANCE, *Examiner.*